(12) United States Patent
Zhang et al.

(10) Patent No.: US 9,953,056 B2
(45) Date of Patent: Apr. 24, 2018

(54) MULTI-QUERY OPTIMIZER FOR COMPLEX EVENT PROCESSING

(71) Applicant: SAP SE, Walldorf (DE)

(72) Inventors: Shuhao Zhang, Singapore (SG);
Hoang Tam Vo, Singapore (SG);
Daniel Hermann Richard Dahlmeier, Singapore (SG); Bingsheng He, Singapore (SG)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 14/840,067

(22) Filed: Aug. 31, 2015

(65) Prior Publication Data

US 2017/0060947 A1 Mar. 2, 2017

(51) Int. Cl.
*G06F 17/30* (2006.01)

(52) U.S. Cl.
CPC .. *G06F 17/30463* (2013.01); *G06F 17/30327* (2013.01); *G06F 17/30516* (2013.01)

(58) Field of Classification Search
None
See application file for complete search history.

(56) References Cited

U.S. PATENT DOCUMENTS

| | | | | |
|---|---|---|---|---|
| 2007/0050328 | A1* | 3/2007 | Li | G06F 17/30967 |
| 2011/0072006 | A1* | 3/2011 | Yu | G06F 17/30451 |
| | | | | 707/718 |
| 2012/0254597 | A1* | 10/2012 | Delling | G06F 17/11 |
| | | | | 712/233 |
| 2014/0095471 | A1* | 4/2014 | Deshmukh | G06F 17/30463 |
| | | | | 707/714 |
| 2014/0237487 | A1* | 8/2014 | Prasanna | G06F 11/3089 |
| | | | | 719/318 |
| 2016/0203404 | A1* | 7/2016 | Cherkasova | G06F 17/30445 |
| | | | | 706/12 |

OTHER PUBLICATIONS

Netfonds Bank, Netfonds stock data, http://www.netfonds.no., retrieved Online on Jun. 23, 2016.
SAP, SAP HANA Data Center Intelligence, http://scn.sap.com/docs/DOC-60256, Aug. 2014.
Yanif Ahmad et al., Distributed Operation in the Borealis Stream Processing Engine, in Proc. of SIGMOD, 2005, pp. 882-884, USA.
Mert Akdere et al., Plan-based Complex Event Detection Across Distributed Sources, Proc. VLDB Endowment, Aug. 2008, New Zealand.
Anat Bremler-Barr et al., CompactDFA: Scalable Pattern Matching Using Longest Prefix Match Solutions, Networking, IEEE/ACM Transactions on, 22(2):415-428, Apr. 2014.
Lars Brenna et al., Cayuga: A High-Performance Event Processing Engine, in Proc. of SIGMOD, Jun. 2007, pp. 1100-1102, China.

(Continued)

*Primary Examiner* — Son T Hoang
(74) *Attorney, Agent, or Firm* — Jones Day

(57) ABSTRACT

Jumbo query plans are generated by applying at least one sharing technique and combining at least two of the pattern queries. Costs of the jumbo query plans may then be estimated and used to search for an optimal query plan. The optimal query plan may then be executed on an input data stream to generate an output data stream.

18 Claims, 14 Drawing Sheets

(56) References Cited

OTHER PUBLICATIONS

Lars Brenna et al., Distributed Event Stream Processing with Non-deterministic Finite Automata, in Proc. of DEBS, Jul. 2009, USA.

Raul Castro Fernandez et al., Integrating Scale Out and Fault Tolerance in Stream Processing using Operator State Management, in Proc. of SIGMOD, Jun. 2013, pp. 725-736, USA.

Moses Charikar et al., Approximation Algorithms for Directed Steiner Problems. In Proc. of SODA, 1998, pp. 192-200.

Gianpaolo Cugola et al., Processing Flows of Information: From Data Stream to Complex Event Processing, Jun. 2012, Comput. Surv., 44(3):15:1-15:62, ACM.

Daniel S. Hirschberg, Algorithms for the Longest Common Subsequence Problem, Journal of the Association for Computing Machinery, Oct. 1977, vol. 24, No. 4, ACM.

Martin Hirzel, Partition and Compose: Parallel Complex Event Processing, in Proc. of DEBS, Jul. 2012, pp. 191-200, ACM, Germany.

Mingsheng Hong et al., Rule-Based Multi-Query Optimization, in Proc. of EDBT, Mar. 2009, pp. 120-131, ACM, Russia.

Mo Liu et al., E-Cube: Multi-Dimensional Event Sequence Analysis Using Hierarchical Pattern Query Sharing, in Proc. of SIGMOD, 2011, pp. 889-900, USA.

A. Lucena et al., A Branch and Cut Algorithm for the Steiner Problem in Graphs, Networks, 1998, 31(1):39-59, John Wiley & Sons, Inc.

Yuan Mei et al., ZStream: A Cost-based Query Processor for Adaptively Detecting Composite Events, in Proc. of SIGMOD, 2009, pp. 193-206, ACM, USA.

Ella Rabinovich, Pattern Rewriting Framework for Event Processing Optimization, in Proc. of DEBS, Jul. 2011, pp. 101-112, ACM, USA.

SAP, SAP Event Stream Processing, retrieved Online Jun. 23, 2016.

Schultz-Moeller et al., Distributed complex event processing with query rewriting, in Proc. of DEBS, 2009, ACM, New York.

Timos K. Sellis, Multiple-Query Optimization, Transactions on Database Systems, Mar. 1988, vol. 13, No. 1, pp. 23-52, ACM.

Alex J. Smola et al., A Tutorial on Support Vector Regression, Statistics and Computing, 2004, 14(3):199-222, Kluwer Academic Publishers.

Andrew S. Tanenbaum et al., Distributed Systems: Principles and Paradigms, https://vowi.fsinf.at/images/b/bc/TU_Wien-Verteilte_Systeme_VO_(G%C3%B6schka)_-_Tannenbaum-distributed_systems_principles_and_paradigms_2nd_edition.pdf, 2006, Prentice-Hall, Inc., USA.

Di Wang et al., Active Complex Event Processing over Event Streams, Proceedings of the VLDB Endowment, 2011, vol. 4, No. 10, Washington.

Haopeng Zhang et al., On Complexity and Optimization of Expensive Queries in Complex Event Processing, in Proc. of SIGMOD, 2014, pp. 217-228.

\* cited by examiner $q_1$ : PATTERN (5 s : A,B,C);
$q_2$ : PATTERN (5 s : A,C);
$q_3$ : PATTERN (5 s : A,B,D);
$q_4$ : PATTERN (5 s : B,D,C);
$q_5$ : PATTERN (5 s : A&&C);

US 9,953,056 B2

MULTI-QUERY OPTIMIZER FOR COMPLEX EVENT PROCESSING

TECHNICAL FIELD

The present disclosure relates generally to a multi-query optimizer for facilitating complex event processing.

BACKGROUND

Complex Event Processing (CEP) is a method of tracking and analyzing streams of information from multiple data sources about things that happen and identifying an event or pattern of events from them. CEP systems have been designed to support complex event detection queries. Recently, applications such as radio-frequency identification (RFID), healthcare, multi-tenant stock monitoring and data center monitoring are emerging, wherein event stream data are being shared among users and many concurrent pattern queries are being submitted. For example, users may be interested in different patterns of stock trade events from New York Stock Exchange (NYSE). Those patterns often partially overlap with each other and the stream data (stock trade events) is commonly shared by users.

Sub-expression sharing has been proposed as a basic technique for sharing common computation among pattern queries. The essence of this sharing technique is that pattern queries can simply merge their common prefix, infix or suffix state in order to avoid duplicate computation. Nevertheless, these existing studies rely on heuristics, such as longest prefix sharing, which can lead to a sub-optimal execution plan for the whole query set.

SUMMARY

A computer-implemented technology for facilitating complex event processing is described herein. In accordance with one aspect, jumbo query plans are generated by applying at least one sharing technique and combining at least two of the pattern queries. Costs of the jumbo query plans may then be estimated and used to search for an optimal query plan. The optimal query plan may then be executed on an input data stream to generate an output data stream.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, computer-controlled apparatus, a computer process, a computing system, or as an article of manufacture such as a computer-usable medium.

The present framework facilitates complex event processing (CEP). In accordance with one aspect, a multi-query optimizer for pattern query processing based on CEP systems is provided. Different from multi-query optimizations in relational databases, the multi-query optimizer is designed for pattern queries in CEP. Disclosed herein are two types of sharing techniques that can be applied together to avoid redundant computation among pattern queries and achieve fine-grained optimization. The first technique, called common sharing technique (CST), allows sharing after proper pattern query decomposition. Specifically, the original pattern query may be decomposed into multiple sub-queries, so that sharing opportunities based on these sub-queries can be discovered. The second technique, called operator transformation technique (OTT), provides a set of rules for transforming one pattern operator to another so that we can discover sharing opportunities among pattern queries even with different types of operators.

As there are many ways to apply the aforementioned sharing techniques to a set of queries, a large number of alternative execution plans can be generated. A cost-driven approach is described herein to guide the generation of an optimal execution plan for the whole query set. In order to find the optimal plan, the multi-query optimization problem may be mapped to a Directed Steiner Minimum Spanning Tree problem. Based on this mapping, a branch-and-bound searching strategy is used to solve this non-trivial problem. In addition, a machine learning-based cost model may be developed to estimate the cost of different alternative execution plans and guide the optimization. The present framework advantageously enables fine-grained sharing opportunities among multiple pattern queries. These and various other features and advantages will be apparent from the following description.

Figure 1:
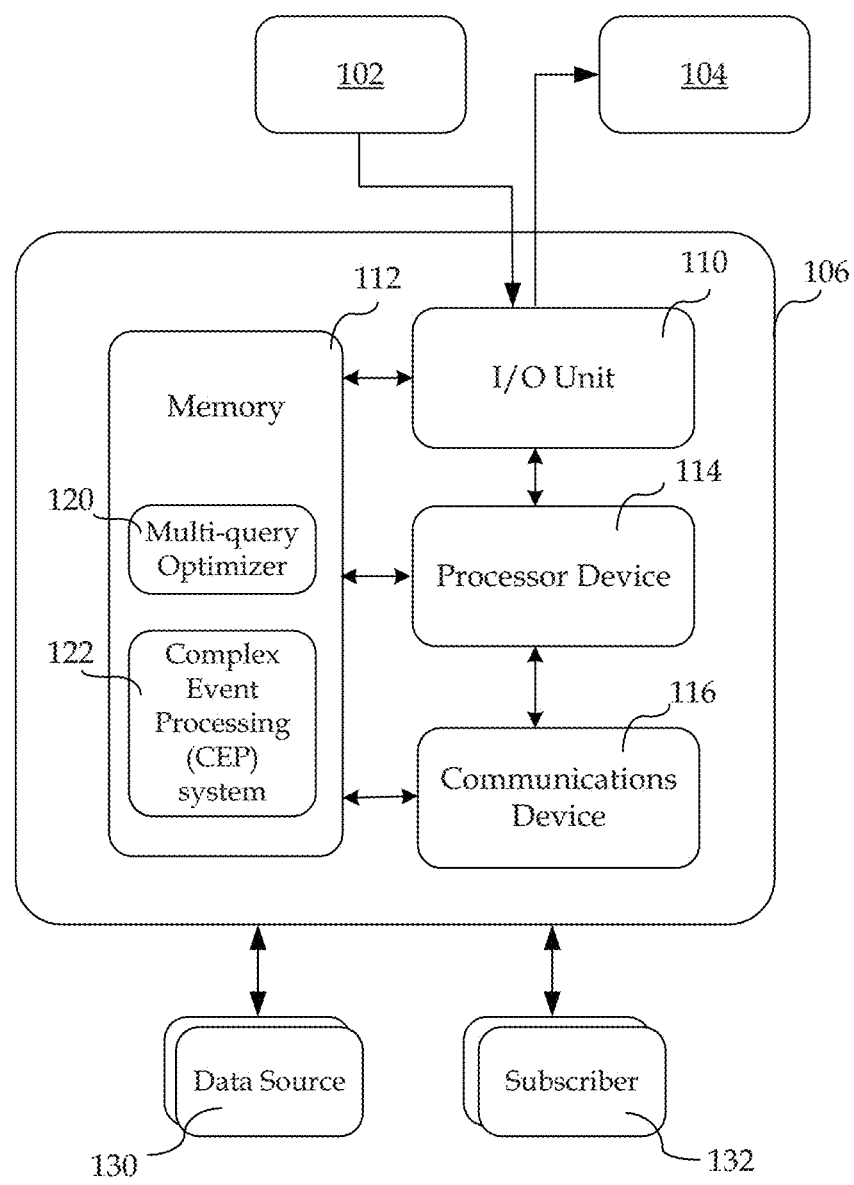
FIG. 1 is a block diagram illustrating an exemplary system.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera etc.) and an output device 104 (e.g., display device, monitor, printer, speaker, etc.). Computer system 106 may include a communications device 116 (e.g., a modem, wireless network adapter, etc.) for exchanging data with a network using a communications link (e.g., telephone line wireless or wired network link, cable network link, etc). The network may be a local area network (LAN) or a wide area network (WAN).

Computer system 106 includes a processor device or central processing unit (CPU) 114, an input/output (I/O) unit 110, and a memory module 112. Other support circuits, such as a cache, a power supply, dock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as multi-query optimizer 120 and complex event processing (CEP) system 122 for implementing the techniques described herein, all of which may be processed by processor device 114. As such, the computer system 106 is a general-purpose computer system that becomes a specific purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein. It should be appreciated that the different components of the computer system 106 may be located on different machines. For example, multi-query optimizer 120 and CEP system 122 may reside in different physical machines.

Multi-query optimizer 120 performs optimization to combine multiple pattern queries into a single jumbo query to be submitted to the CEP system 122. CEP system 122 may be used to process streams of input event data from one or more data sources 130 to identify meaningful patterns within those streams. The output data streams are then presented to one or more subscribers 132 (e.g., applications or databases).

In some implementations, CEP system 122 is the SAP Sybase Event Stream Processor (ESP). Other types of complex event processing systems may also be used. CEP system 122 may use continuous computation language (CCL) as the primary event processing language. CCL is based on Structured Query Language (SQL) and adapted for stream processing. CCL includes features that are required to continuously manipulate data in real-time, such as pattern matching on data streams.

The overall structure of a pattern query may be specified as follows:
SELECT EventList
FROM Stream
MATCHING: [window; PatternList]
EventList specifies the event types of interest; Stream is the input data source, which can be raw input or other queries; window denotes a window constraint that requires the pattern of interest to occur within the specified time interval; PatternList contains event types (i.e., operand of pattern query) connected by pattern operators.

In the following paragraphs, pattern queries may be denoted as PATTERN (window:PatternList) for simplicity. Further, there are a few basic definitions. Primitive events are predefined single occurrences of interest that cannot be split into any smaller events. Composite events are detected by the CEP system from a collection of primitive and/or other composite events. A single query plan (SQP) may be used to denote single query plan of a pattern query and jumbo query plan (JQP) may be used to denote a set of pattern queries that are executed together with or without optimization.

In some implementations, a pattern query may include one or more pattern operators, such as follows: (1) Sequence operator (,); (2) Negation operator (!); (3) Conjunction operator (&&); and (4) Disjunction operator (||). A sequence operator (,) requires the occurrence of both operands linked by it. Further, the sequence operator requires the operand on the left of the operator to occur before the operand on the right. For example, PATTERN (5s:A,B,C) generates a composite event {a,b,c} if within specified interval (5s), an event A occurred followed by an event B, which followed by an event C. A negation operator (!) requires the non-occurrence of the linked operand. For instance, PATTERN (5s:A,!B,C) generates a composite event {a,c} if within specified interval (5 seconds), an event A occurred followed by an event C, and no event B occurred.

A conjunction operator (&&) requires the occurrence of both operands linked by it, regardless of their arrival order. For example, PATTERN (5s:A&&C) generates a composite event as {a&&c} if both events A and C to happen within 5 seconds but does not enforce the occurring sequence of them. A disjunction operator (||) requires occurrence of one or both operands in order to generate output. For instance, PATTERN (5s:B||C) generates a composite event as {b&&c} once event B and C occurred within specified time interval regardless of the occurring sequence, OR generate output as a single event as {b} or {c} if either event B or C occurred alone within every 5 seconds.

Figure 2:
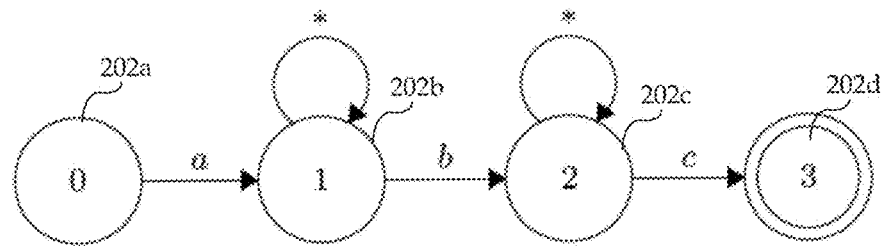
FIG. 2 shows an exemplary pattern query represented as a finite-state machine.

In some implementations, pattern matching is implemented based on a finite-state machine (FSM). FIG. 2 shows an exemplary pattern query represented as a finite-state machine 201. Every state 202a-202d of the finite-state machine 201 corresponds to a partial detection of the composite events. The finite-state machine 201 is only in one state at a time; the state it is in at any given time is called the current state. The finite-state machine 201 can change from one state to another when initiated by a triggering event or condition (i.e., transition).

In FIG. 2, the finite-state machine 201 of the query q1=PATTERN (5s:A,B,C) is shown. In the beginning, the state is 0. When event A arrives, the state transits to state 1 and waits for event B. If there is no successful transition to final state 3 (i.e., no event C arrives) within 5 seconds, the state machine 101 discards the current stored events and falls back to the initial state 0 and restarts to wait for event A. Note that state 1 and 2 contain a self-loop marked by a wildcard *. Given an event, these states allow the state machine 101 to loop at the same state if it does not match with the event type associated with the forward edge.

In some implementations, data-flow programming (DFP) is used to process event streams. DFP breaks a potentially complex computation into a sequence of operations with data flowing from one operation to the next. This technique also provides scalability and potential parallelization, since each operation is event driven and independently applied. Each operation processes an event only when it is received from another operation.

Figure 3:
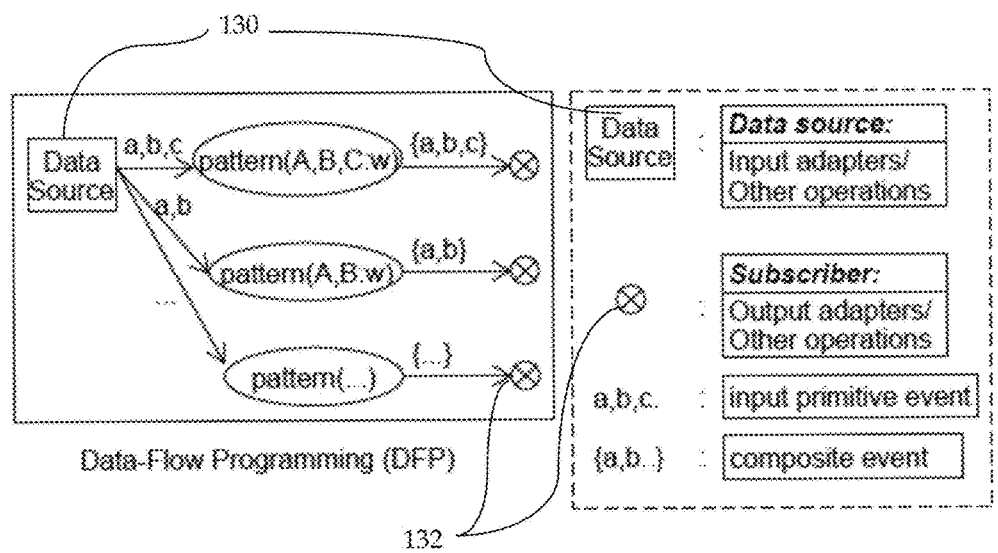
FIG. 3 illustrates an exemplary data-flow programming model.

FIG. 3 illustrates an exemplary data-flow programming model 301. Stream data from data source 130 flows through a loop-free and directed graph of processing operations. Ultimately, the output streams are presented to subscribers 132. Pattern queries are represented as an oval. Other operations, such as stream filtering, window aggregation, etc., are omitted for simplicity. Data source 130 may include: 1) input adapters which are used to receive data from external systems (e.g., database input adapters receive data from external databases, socket adapters receive data from web sockets); or 2) upstream operations (e.g., filter operation) which produce stream data as its computing results. Examples of subscribers 132 may include: 1) output adapters that directly output data to external applications (i.e., database or TCP/IP port); or 2) other downstream operations for further processing aggregation).

CEP system 122 may be designed to be heavily multi-threaded. Each operation (e.g., filter operation, pattern query, etc.) runs in its own thread. These threads compete for limited processing resources. To limit the competition for processor or central processing unit (CPU) cores when there are more threads, a self-tuning mechanism of fixed size queues may be used to dedicate as much processing resources as possible to those threads that need it the most. With fixed size queues, a stream that is processing faster than its dependents fills up the dependent queue and is blocked from further processing. This reduces competition for processing resources and, gradually, the slowest streams get larger processor time slices to drain their queues.

Figure 4:
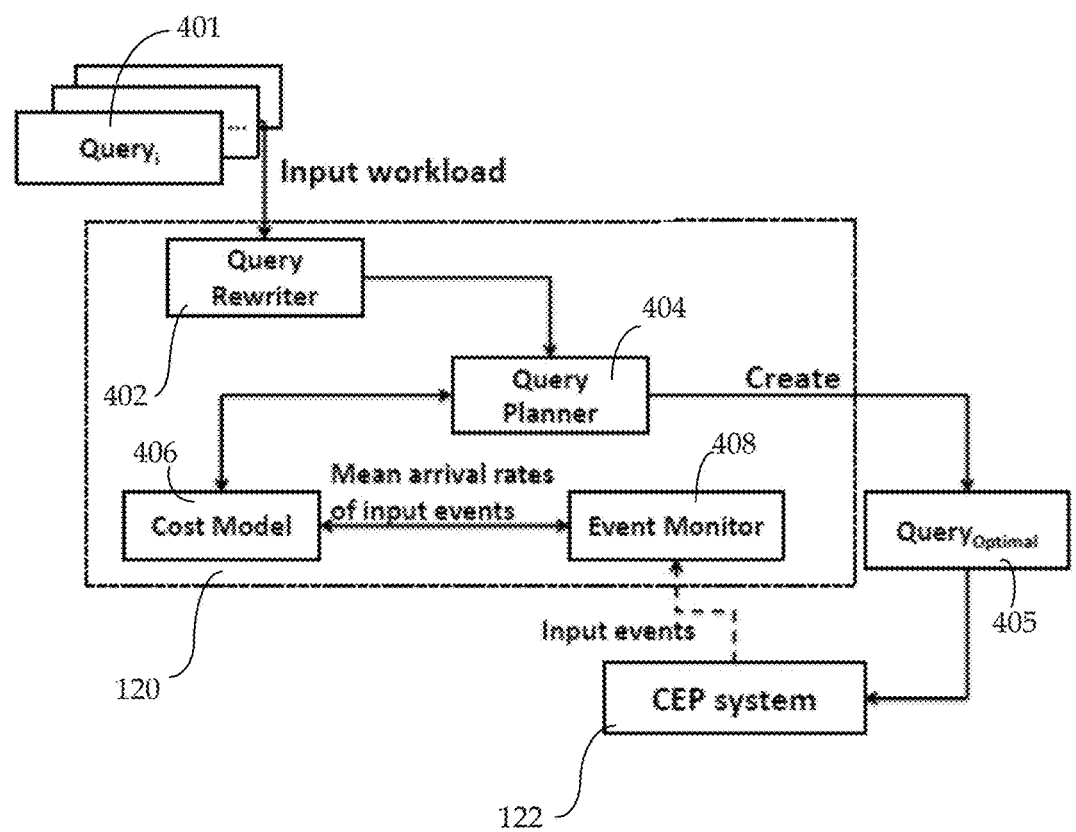
FIG. 4 illustrates an exemplary optimization workflow of the multi-query optimizer.

FIG. 4 illustrates an exemplary optimization workflow of the multi-query optimizer 120. In some implementations, the multi-query optimizer 120 includes four main modules: (1) query rewriter 402; (2) query planner 404; (3) cost model 406; and (4) event monitor 408. Other modules may also be included.

Query rewriter 402 applies one or more sharing techniques to a given workload and produces different JQPs that are more efficient. More details of such sharing techniques will be provided herein. Given a workload of multiple pattern queries 401, many jumbo query plans (JQPs) may be derived. In principle, all the alternatives should be considered so that the one with the best-estimated performance is chosen. Query planner 404 examines all possible JQPs produced by query rewriter 402 and selects the overall most efficient one 405 (with the lowest cost) to be used to generate the answer to the original workload. In some implementations, the query planner 404 uses a searching strategy based on Direct Steiner Minimum Tree, which will be discussed in more details herein. The JQP examined by the query planner 404 are compared based on estimates of their cost so that the cheapest may be chosen. These costs are derived by cost model 406 and event monitor 408.

Cost model 406 specifies the arithmetic formulas that may be used to estimate the costs of the JQPs. For different JQPs, with or without applying the sharing techniques, the costs may be determined using the average arrival rates of stream events, which can be estimated by event monitor 408. Event monitor 408 continuously monitors the arrival rates of input stream events. As previously mentioned, these estimates are used by cost model 406. Further details of cost model 406 and event monitor 408 will be described herein. The input stream events may be provided by CEP system 122. The whole optimization may take around few milliseconds for tens of queries to minutes for few hundreds of queries. This is acceptable since pattern queries are designed to be continuously executed for long time, typically hours or days.

Figure 5:
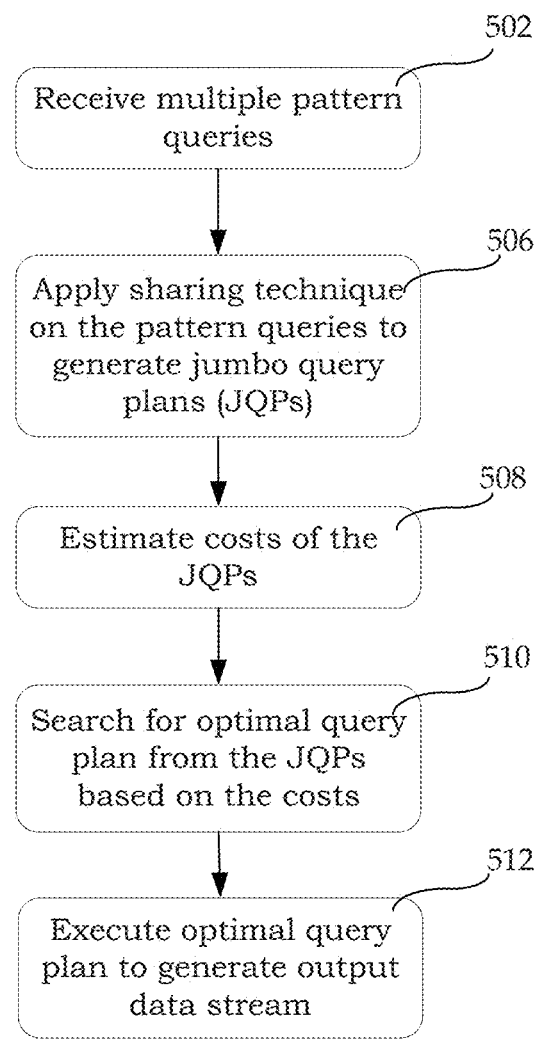
FIG. 5 is a block diagram illustrating an exemplary method of optimizing multiple queries.

FIG. 5 is a block diagram illustrating an exemplary method 500 of optimizing multiple queries. The computer system 106 of FIG. 1 and workflow components of FIG. 4 may be configured by a computer program code to implement some or all acts of the process 500. While process flow 500 describes a series of acts that are performed in sequence, it is to be understood that process 500 is not limited by the order of the sequence. For instance, some acts may occur in a different order than that described. In addition, an act may occur concurrently with another act. In some instances, not all acts may be performed.

At 502, query rewriter 402 receives multiple pattern queries. A pattern query is a request for information regarding an event or pattern of events that can be identified from a stream of input data. Such pattern queries may be provided by one or more subscribers 132, and the input data stream may be provided by one or more data sources 130.

Figures 6, 7:
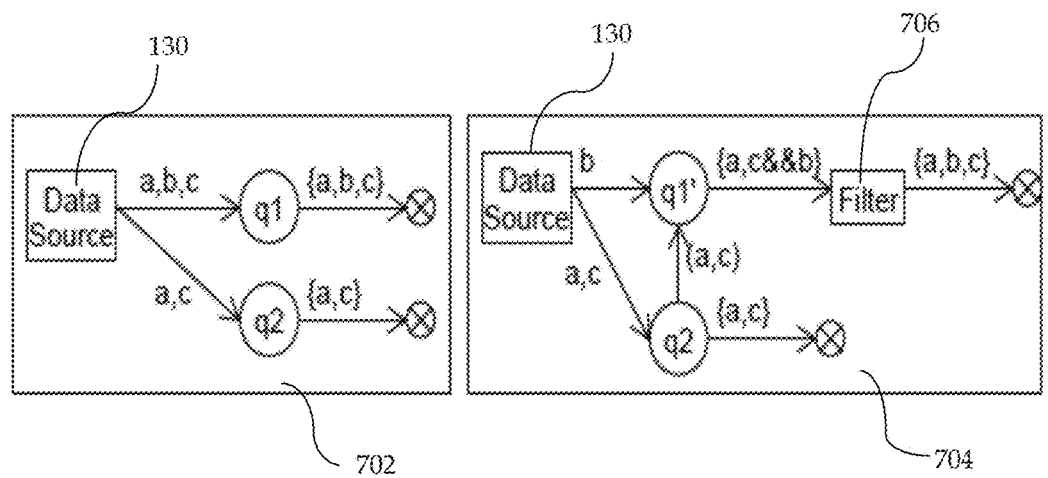
FIG. 6 shows an exemplary workload of pattern queries.
FIG. 7 illustrates an exemplary application of the merging sharing technique.

FIG. 6 shows an exemplary workload of pattern queries ($q_1$ to $q_5$). Such workload may be referred to herein as "Workload 1" for purposes of illustration herein. $q_2$ is identical to $q_1$ except that event B is not of interest. $q_3$ has common prefix to $q_1$. The prefix of $q_4$ (i.e., B,D) is common to the suffix of $q_3$. $q_5$ has same event types of interest compared to $q_2$ but with different pattern operators applied. These cases commonly appear in our real use cases. For simplicity of illustration, the window constraint size (w) is set to 5 seconds for the following examples.

At 506, query rewriter 402 applies one or more sharing techniques on the pattern queries to generate jumbo query plans (JQPs). A jumbo query plan (JQP) is generated by combining at least two pattern queries to share computing results and enhance computing efficiency. The (JQP) may change with the application of different sharing techniques. The sharing techniques may include a merge sharing technique, a common sharing technique, and/or an operator transformation technique. Other sharing techniques are also useful.

Merge sharing technique (MST) re-uses the computing results of one query to answer another query of the same pattern operator type. Consider, for example, two pattern queries: $q_i$=PATTERN (w:$L_i$) and $q_j$=PATTERN (w:$L_j$), where $L_i$ is a subsequence of $L_j$. A subsequence is a sequence that can be derived from another sequence by deleting some elements without changing the order of the remaining elements. For example, the sequence {A,B,D} is a subsequence of {A,B,C,D,E,F}. If $L_i$ is a subsequence of $L_j$, then the results of $q_j$ may be constructed by joining the results of $q_i$ with the remaining event types in $L_j$ but not in $L_i$.

FIG. 7 illustrates an exemplary application of the merge sharing technique upon $q_1$ and $q_2$ from workload 1 (depicted in FIG. 6). More particularly, diagram 702 represents the JQP obtained from $q_1$ and $q_2$ without applying the technique, white diagram 704 represents the JQP of $q_1$ obtained by applying the technique. In diagram 704, the query $q_1'$=PATTERN ({A,C} && B), where {a,c} represents the composite event type. Comparing the optimized JQP (704) to the original JQP (702), although a post filter 706 is needed to enforce the time sequence of event B in order to answer $q_1$, the pattern detection process of events A and C can be shared to enhance efficiency.

MST has an implicit restriction that the query can only share its results entirely with another query. Common sharing technique (CST) removes this restriction to enable sharing intermediate results among queries indirectly. CST is based on the observation that a pattern query can be broken into multiple sub-queries (i.e., pattern query decomposition). In some implementations, a finite-state machine (FSM) is decomposed into smaller FSMs by sending intermediate results between each other (i.e., FSM decomposition). This approach naturally matches with the present data-flow programming model. A single query plan (SQP) is referred to as a left (right) decomposed SQP if its corresponding FSM is separated into multiple FSMs. Such decomposition may be performed by separating the prefix (suffix) two operands into one FSM and linking the output with the rest.

Figure 8:
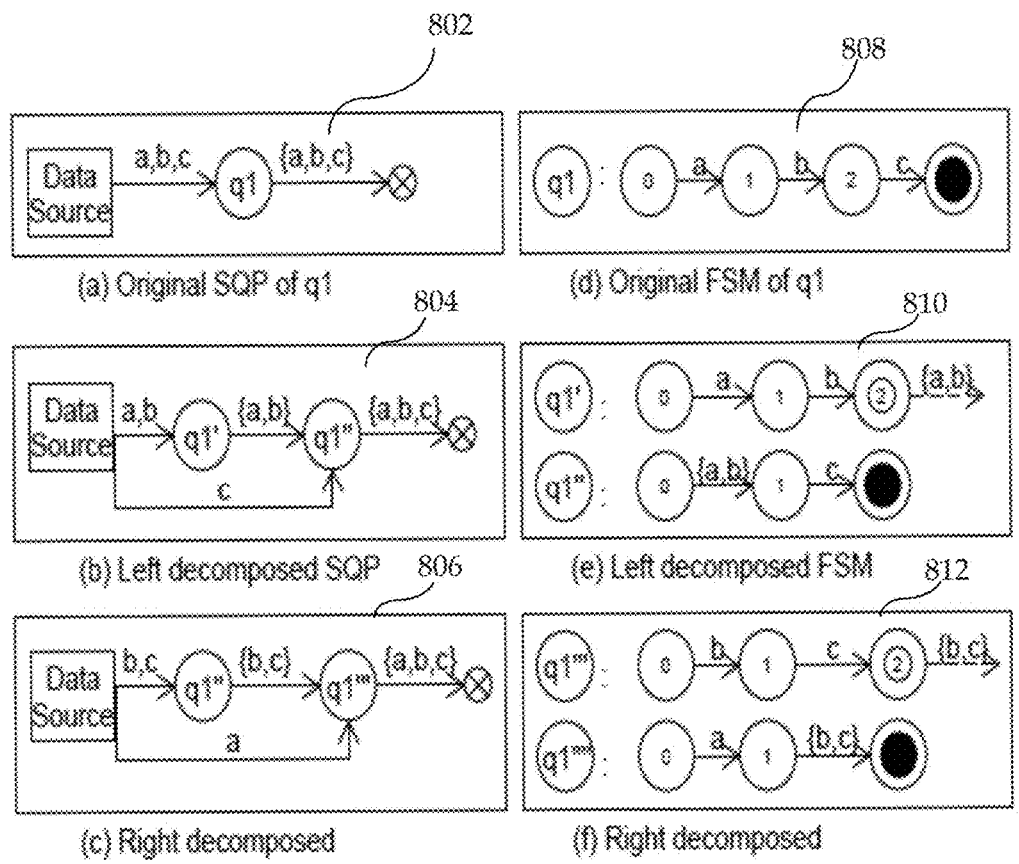
FIG. 8 illustrates different exemplary single query plans.

FIG. 8 illustrates different exemplary single query plans (SQPs) of pattern query $q_1$. Diagram 802 illustrates the original single query plan (SQP) of $Q_1$, diagram 804 illustrates the left decomposed SQP, and diagram 806 depicts the right decomposed SQP. The corresponding FSMs of such SQPs are illustrated by diagrams 808, 810 and 812.

Existing works focus on the partition and parallelization aspects, while the present framework uses FSM decomposition to enable sharing between pattern queries. The main idea is that given two pattern queries, their original FSMs may be decomposed into multiple sub-FSMs, resulting in many different SQPs. As long as their SQPs involve common FSMs, the common FSMs may be combined to generate results to serve both queries.

CST may be applied to enable sharing of results between two pattern queries by using a common sub-query identified from the sub-queries obtained by FSM decomposition. Consider a sequence pattern query $q_k$=PATTERN (w:$L_k$), where $L_k$=$E_1$, ..., $E_j$, ..., $E_m$, ..., $E_k$. Then $q_x$=PATTERN (w:$L_x$) is its sub-query if: (1) $L_x$=prefix of $L_k$ (i.e., $E_1$, ..., $E_j$); (2) $L_x$=suffix of $L_k$ (i.e., $E_m$, ..., $E_k$); or (3) $L_x$=infix of $L_k$ (i.e., $E_j$, ..., $E_m$). For any first and second pattern queries ($q_i$, $q_j$), if a query $q_x$ exists such that $q_x$ is a common sub-query for both $q_i$ and $q_j$, then $q_i$ and $q_j$ can be computed based on the results of $q_x$.

Figure 9:
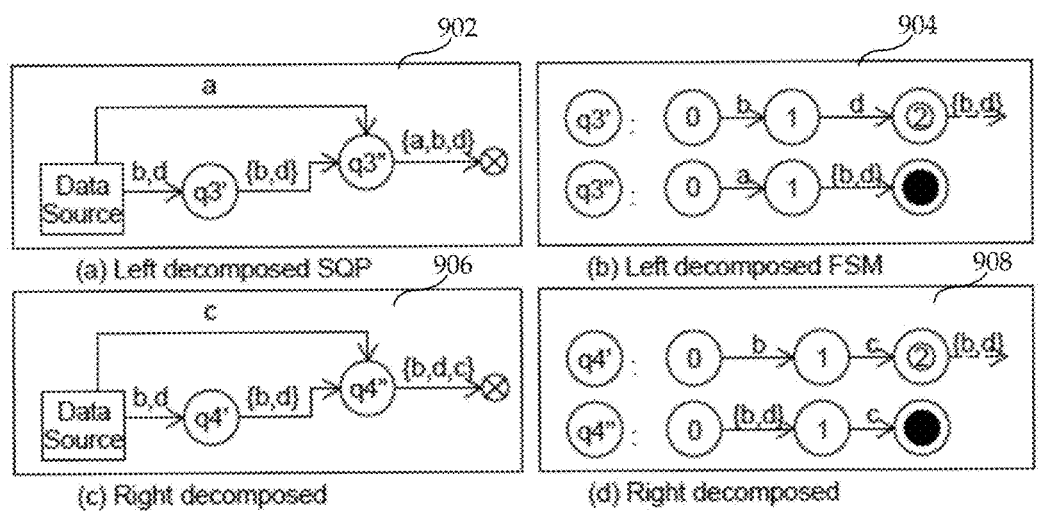
FIG. 9 illustrates the decomposed single query plan of pattern queries $q_3$ and $q_4$.

FIG. 9 illustrates the decomposed SQP of pattern queries $q_3$ and $q_4$ respectively. More particularly, diagrams 902 and 906 represent the left and right decomposed SQPs, while diagrams 904 and 908 represent the corresponding left and right decomposed FSMs. As shown both SQPs have FSMs that include their common sub-query: $q_x$=$q_3'$=$q_4'$=PATTERN (A,B). The common FSMs may be merged into one.

Figure 10:
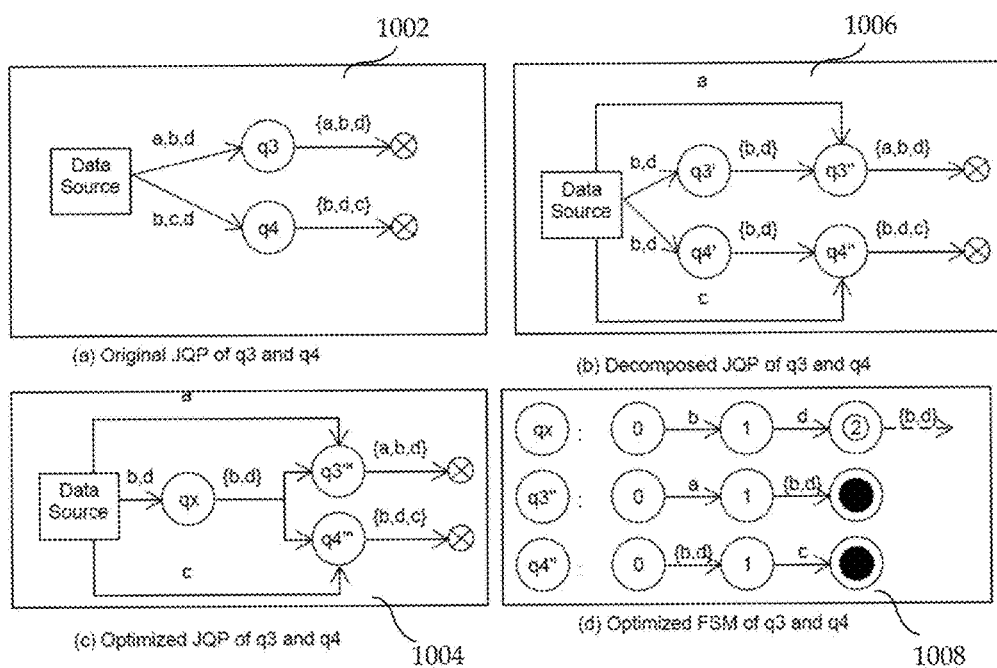
FIG. 10 illustrates an exemplary application of the common sharing technique.

FIG. 10 illustrates an exemplary application of the common sharing technique (CST) on pattern queries $q_3$ and $q_4$. More particularly, diagram 1002 illustrates the original JQP of a workload containing $q_3$ and $q_4$. Diagram 1004 shows the optimized JQP of $q_3$ and $q_4$, white diagrams 1006 and 1008 illustrate the decomposed JQP and corresponding optimized FSM of $q_3$ and $q_4$. The overall execution cost is reduced compared to original plan 1002, since the results of $q_x$ are shared by both $q_3$ and $q_4$. Intuitively, pattern queries that have a common prefix can simply merge their common prefix in order to reduce duplicate computation. However, merging prefix patterns in all cases may lead to a sub-optimal query plan, as shown in the following example.

Consider a workload containing pattern queries $q_1$=PATTERN (5s:A,B,C), $q_2$=PATTERN (5s:A,B,D) and $q_3$=PATTERN (5s: C,B,D). The prefix A,B of $q_1$ and $q_2$ may be merged, but such decision means $q_2$ cannot share the computing results of PATTERN (B,D) with $q_3$. Thus, a cost model may be used to compare the alternative plans, as will be described herein.

Based on MST or CST, queries must use the same type of pattern operators to be able to share. In accordance with some implementations, the pattern operator itself is transformed to create additional sharing opportunities and enable further sharing. This technique is referred to herein as the Operator Transformation Technique (OTT).

There may be several different types of transformation rules. One exemplary type of transformation rule involves negation to sequence transformation, which transforms a pattern query with negation operator to a pattern query with a sequence operator using a filter. Consider $q_n$=PATTERN (w:$E_1$, ..., $E_n$, !$E_x$), $q_s$=PATTERN (w: $E_1$, ..., $E_i$, ..., $E_n$). Then, $q_n$=$q_s$→Filter$_{ns}$, where → stands for connecting the output of the left component to the input of the right component. Filter$_{ns}$ works as follows: whenever $E_x$ arrives, all current cached results from $q_s$ are deleted; otherwise, it periodically outputs its cached results according to the specified time interval.

Figure 11:
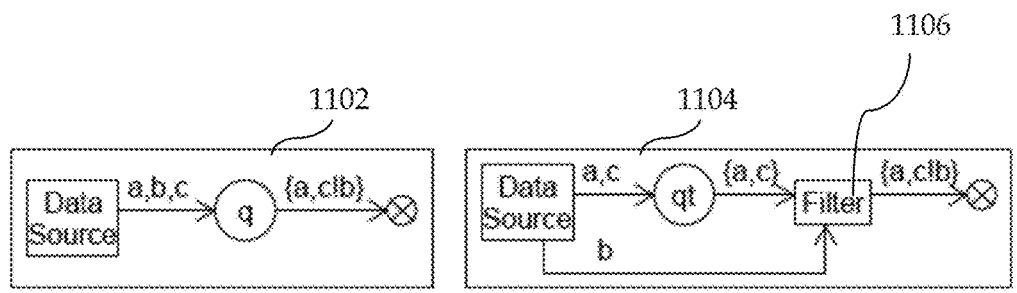
FIG. 11 illustrates an exemplary negation to sequence transformation.

FIG. 11 illustrates an exemplary negation to sequence transformation. More particularly, diagram 1102 shows the original single query plan of q=PATTERN (w:A,C!B), while diagram 1104 shows the transformed single query plan of q. q is transformed to $q_r$=PATTERN (w:A,C), where the filter 1106 generates {a,c!b} only if a composite event {a,c} arrives and no event b arrives within time interval w.

Another type of transformation rule involves sequence to conjunction transformation, which transforms a pattern query with sequence operator to a pattern query with a conjunction operator using a filter. Assume $q_s$=PATTERN (w; $E_1$, ..., $E_i$, ..., $E_n$), $q_c$=PATTERN (w: $E_1$ & ... & $E_i$ & ... & $E_n$). Then, $q_s$=$q_c$→Filter$_{sc}$. Filter$_{sc}$ works as follows: whenever result from $q_c$ arrives, Filter$_{sc}$ outputs it only if $E_1.ts < \ldots < E_i.ts < \ldots < E_n.ts$, where ts refers to the timestamp of the event. Each event may be assigned a timestamp (denoted as $t_s$) to represent its occurring timestamp when the event is received.

Figure 12:
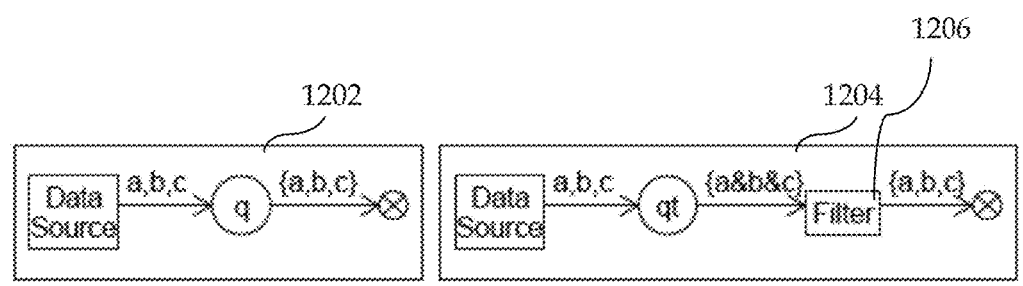
FIG. 12 illustrates an exemplary sequence to conjunction transformation.
Figure 13:
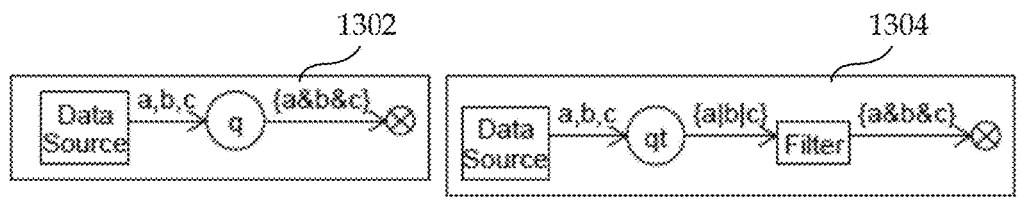
FIG. 13 illustrates an exemplary junction to disjunction transformation.

FIG. 12 illustrates an exemplary sequence to conjunction transformation. More particularly, diagram 1202 illustrates the original SQP of pattern query q, while diagram 1204 shows the transformed SQP of q. As shown, PATTERN (w:A,B,C) is transformed to PATTERN (w:A&&B&&C). The filter operation 1206 generates results {a,b,c} only if {a&b&c} arrives, and a.ts<b.ts<c.ts Yet another type of transformation rule involves conjunction to disjunction transformation, which transforms a pattern query with conjunction operator to a pattern query with a disjunction operator using a filter. Assume $q_c$=PATTERN (w:$E_1$ & ... & $E_i$ & ... & $E_n$), $q_d$=PATTERN (w:$E_1$ ∥ ... ∥$E_i$∥ ... ∥$E_n$). Then, $q_c=q_d \rightarrow$Filter$_{cd}$. Filter$_{cd}$ works as follows: whenever a result is generated from $q_d$, Filter$_{cd}$ eliminates it unless the result is a composite event consisting of all $E_1, \ldots, E_i, \ldots, E_n$. FIG. 13 illustrates an exemplary conjunction to disjunction transformation. More particularly, diagram 1302 illustrates the original SQP of pattern query q, while diagram 1304 shows the transformed SQP of q.

The above three rules cover substantially all possible transformations among those four operators. All operators can be transformed (directly/indirectly) to a disjunction operator as: negation→sequence→conjunction→disjunction. To illustrate the usefulness of operator transformation, consider $q_2$ and $q_5$ from Workload 1 (as illustrated in FIG. 6). Since $q_2$ requires different pattern operators from $q_5$, there is no way to share the intermediate results between them. However, if the operator transformation rifle (sequence→conjunction) is used, $q_2$ can be transformed into $q_2'$, where $q_2'$=PATTERN (5s:A&&C)→Filter$_{sc}$. In this case $q_2'$ is equal to $q_5$. Thus, $q_2'$ need not be computed separately.

Figure 14:
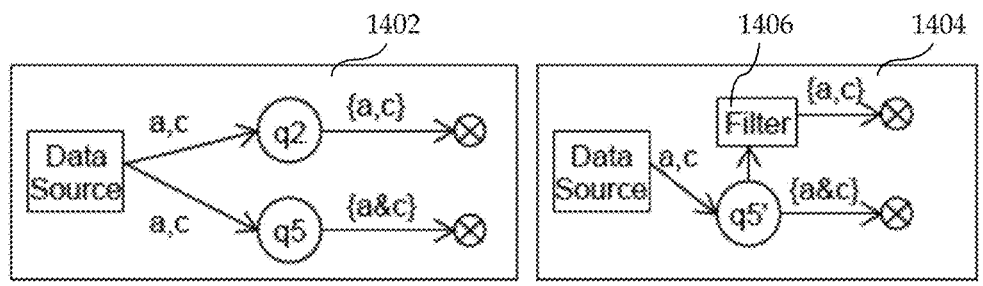
FIG. 14 illustrates an exemplary application of the operator transformation technique.

FIG. 14 illustrates an exemplary application of the operator transformation technique (OTT). Diagram 1402 represents the original jumbo query plan (JQP) where $q_2$ and $q_5$ are executed from scratch, while diagram 1404 represents the JQP after applying operator transformation. $q_5$ is still executed from scratch, but its results can be used to compute $q_2$. Indeed, this transformation essentially swaps the PATTERN (A,C) with a Filter$_{sc}$ operation 1406. The Filter$_{sc}$ operation 1406 is much more efficient because of the reduced input size, resulting in a computationally cheaper JQP.

Figure 15:
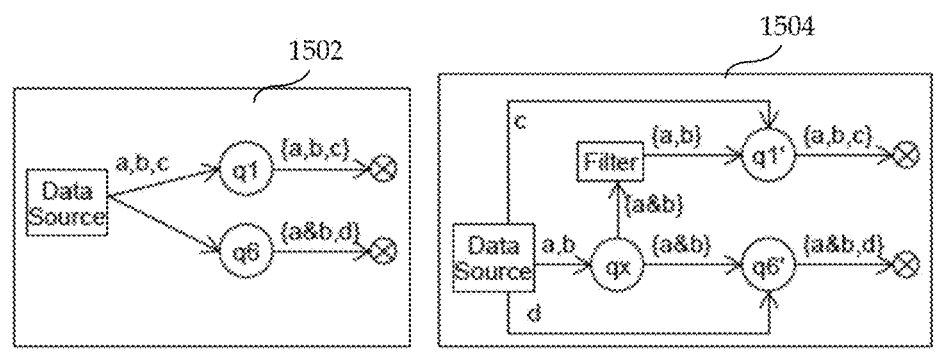
FIG. 15 illustrates an exemplary application of the operator transformation technique and the common sharing technique.

FIG. 15 illustrates an exemplary application of the OTT and the CST. Consider query $q_6$=PATTERN (A&&B,D) and $q_1$ from Workload 1 (as shown in FIG. 6). Diagram 1502 represents the original jumbo query plan (JQP) where $q_1$ and $q_6$ are executed from scratch, while diagram 1504 represents the JQP after applying operator transformation and common sharing technique. $q_6$ and $q_1$ each has the following sub-query: $q_x$=PATTERN (A&&B) and $q_y$=PATTERN (A,B). $q_y$ can be transformed to $q_x$. Thereafter, $q_x$ can be shared by both $q_6$ and $q_1$.

The implementation for Filter$_{sc}$ requires a simple filter operation. It scans each incoming stream data (a composite event) and checks the occurring timestamp of each event type. In contrast, the implementation for Filter$_{ns}$ and Filter$_{cd}$ more complicated. They can be implemented using SPLASH, which is a procedural language introduced as a complementary component to standard CCL. In SAP Sybase ESP, for example, an operation called FLEX is used to execute SPLASH code to process events.

In some implementations, query rewriter 402 identifies sharing opportunities between a pair of pattern queries prior to applying the sharing techniques. In order to identify sharing opportunities between a pair of pattern queries, query rewriter 402 examines all single query plans (SQPs) of each query (considering finite-state machine decomposition) and then compare each pair of sub-queries to check whether they are same.

Returning to FIG. 5, at 508, cost model 406 estimates the costs of the JQPs. The costs may be estimated using the mean (or average) arrival times of stream events determined by event monitor 408. In some implementations, a machine-learning based approach is used to isolate the design of multi-query optimizer 120 and the CEP 122. This design strategy allows the optimizer 120 and the CEP 122 to be upgraded independently. The cost of different pattern query operators may be accurately estimated, and used to guide the optimizer 120 to select the optimal jumbo query plan.

To simplify the cost model, the following assumptions may be made: (1) the cost model describes asymptotic costs; it compares the costs of alternative plans for guiding the optimizer 120; (2) worst-case output sizes of the plans are used for estimation; and (3) processor resource consumption when processing pattern queries largely depends on event arrival rates.

The cost model for primitive pattern query (i.e., pattern query with 2 event types in its PatternList) may be extended to the general case. Given the mean arrival rate of event $E_i(\mu_{E_i})$ and event $E_j(\mu_{E_j})$, the cost of primitive pattern query with pattern operator (op) can be represented as follows, where $\epsilon$ is the noise term.

$$\text{Cost}_{op} = x1 * \mu_{E_i} + x2 * \mu_{E_j} + \epsilon \quad (1)$$

wherein X={x1,x2}, where x1 is the coefficient of the first input event type ($E_{first}$) and x2 is the coefficient of the second event type ($E_{second}$). In order to compute X for each pattern operator, we measure the throughput, i.e., the rate at which input data are processed, $$\text{throughput} = \frac{|\text{Input}|}{t_{elapsed}},$$

where |Input| is the size of the input stream and $t_{elapsed}$ is the total processing time that has elapsed. Then the cost is estimated as the reciprocal of the throughput, $$\text{Cost} = \frac{1}{t_{elapsed}}.$$

Machine learning algorithms, such as simple polynomial linear regression, support vector regression, multilayer perceptron, Gaussian process for regression, Kstar (K*), etc., may be used to estimate the cost. In some implementations, the cost model that reported the smallest mean absolute error is used.

The cost model may be extended to general cases. The cost of a pattern query with n event types in PatternList can thus be estimated by composing multiple cost models of its sub-queries in a hierarchical manner. For example, to estimate the cost of $q_1$ in workload 1, we first estimate the cost of $q_1'$=PATTERN (A,B) using Equation 1 with $\mu_A$, $\mu_B$, then the cost estimation of q1 can be done by substituting $\mu_{\{A,B\}}$, $\mu_C$ into Equation 1 plus cost of q1'. Note that, since we assume worst case output, $\mu_{\{A,B\}}$=min ($\mu_A$, $\mu_B$).

The mean arrival rates of stream events are continuously monitored through a window operation (i.e., Event Monitor), and the cost model is therefore being periodically updated to deal with changing workload. The overhead caused by this operation is negligible compared to the large workload of the pattern queries subscribed.

The aforementioned cost model may be used to estimate the costs of a query based on another shared query through the application of one or more of the different sharing techniques described with reference to step 506. The cost to calculate $q_i$ based on $q_x$ may be denoted as $Cost(q_i|q_x)$. The cost of the original JQP is denoted as $Cost(org)$, and the cost of optimized JQP is denoted as $Cost(opt)$.

To illustrate cost estimation based on the merge sharing technique, consider $q_1$=PATTERN(A,B,C) and $q_2$=PATTERN (A,C) from Workload 1. To compute $q_1$ based on $q_2$, we first compute $q_2$ from scratch, then apply the conjunction operator with the results of $q_2$ on the extra event list (i.e., {B}), and apply a post filter operation to enforce the time sequence of B, as illustrated in FIG. 7. Therefore, $$Cost(q_1|q_2)=Cost(q_1')+Cost(Filter) \quad (2)$$

$$q_1'=\text{PATTERN}(\{A,C\}\&\& B) \quad (3)$$

The cost of the jumbo query plan (JQP) with/without optimization can be represented as below:

$$Cost(opt) = Cost(q_1 | q_2) + Cost(q_2) \quad (4)$$
$$= Cost(q_1') + Cost(Filter) + Cost(q_2)$$

$$Cost(org) = Cost(q_1) + Cost(q_2) \quad (5)$$

Based on our experiment, Cost(Filter) is very small compared to the cost of a pattern query and may be omitted when performing the cost estimation. Note that in this case, $q_2$ still has to be executed from scratch. Compared to the original JQP, the cost saving is given by $Cost(q_1)-Cost(q_1')$.

To illustrate cost estimation based on the common sharing technique, consider $q_3$=PATTERN (A,B,D), $q_4$=PATTERN (B,D,C) from Workload 1 and their common sub-query $q_x$=PATTERN (B,D). In order to apply common sharing technique, the FSMs of $q_3$ and $q_4$ are decomposed. As shown in FIG. 10, $q_3$ is answered by $q_x$ and $q_3''$=PATTERN(A,{B,C}), $q_4$ is answered by $q_x$ and $q_4''$=PATTERN({B,C},A). Therefore, $$Cost(q_3|q_x)=Cost(q_3'') \quad (6)$$

$$Cost(q_4|q_x)=Cost(q_4'') \quad (7)$$

The cost of the JQP with/without optimization can be represented as below:

$$Cost(opt) = Cost(q_3 | q_x) + Cost(q_4 | q_x) + Cost(q_x) \quad (8)$$
$$= Cost(q_3'') + Cost(q_4'') + Cost(q_x)$$

$$Cost(org) = Cost(q_3) + Cost(q_4). \quad (9)$$

The cost saving is provided by the shared Cost ($q_x$) for two queries.

With Operator Transformation Technique (OTT), the output of transformed queries may be shared with other queries with some additional overhead. For illustration, consider $q_2$ and $q_5$ from Workload 1 (as illustrated in FIG. 6). As shown in FIG. 14, $q_2$ can be transformed to $q_2'$=PATTERN (A&&C). Note in this case, $q_2'$ can be answered entirely by $q_5$. Thus, $$Cost(q_2|q_2')=Cost(filter_{sc}), Cost(q_2')=0. \quad (10)$$

The cost of the jumbo query plan with/without optimization can be represented as below:

$$Cost(opt) = Cost(q_2 | q_2') + Cost(q_2') + Cost(q_5) \quad (11)$$
$$= Cost(filter_{sc}) + Cost(q_5)$$

$$Cost(org) = Cost(q_2) + Cost(q_5). \quad (12)$$

The cost saving is thus given by:

$$Cost(q_2)-Cost(q_2|q_2')=Cost(q_2)-Cost(filter_{sc})$$

$Cost(filter_{sc})$ is very small compared to a sequence pattern query, as this filter only needs to scan through the results once from the corresponding conjunction pattern query. To simplify the cost model, $Cost(filter_{sc})$ may be omitted when performing cost estimation. This does not affect the optimization because there are only two options for whether one query should transform to another, and the cost model is used to determine whether the transformation brings any significant benefits.

At 510, query planner searches for the optimal query plan 405 from the JQPs based on the determined costs. The goal is to find an efficient global jumbo query plan (JQP) for all input queries. For the same set of queries, there can be different options to decide sharing. For instance, a decision to apply common sharing technique on $q_1$=PATTERN (E,A, B), $q_2$=PATTERN (A,B,C,D) and $q_3$=PATTERN (A,B,D) through common sub-query $q_x$=PATTERN (A,B) means that merge sharing technique cannot be applied on $q_2$=PATTERN (A,B,C,D) and $q_3$=PATTERN (A,B,D). In addition, if the common sharing technique is chosen, an additional decision needs to be made to determine which single query plan (SQP) should be chosen for each query.

Every such decision produces a new JQP. This transformation is referred to herein as a JQP transformation. For a workload containing many pattern queries, a significant number of JQPs may be generated. This process can be conceptually modeled as a JQP search tree. Given a batch of queries, the default JQP may stand for all pattern queries that are executed independently. That is, connecting to the data source directly, with no sharing among the pattern queries. Let the root of the JQP tree be the default JQP. Starting from the root, for every JQP transformation, a new node may be added into the tree, with an edge connecting the old node to the new node. The old node and the new node correspond to the original JQP and the new JQP respectively. The edge represents the sharing techniques applied to a pair of queries. The resulting tree is referred to herein as a JQP search tree.

Figure 16:
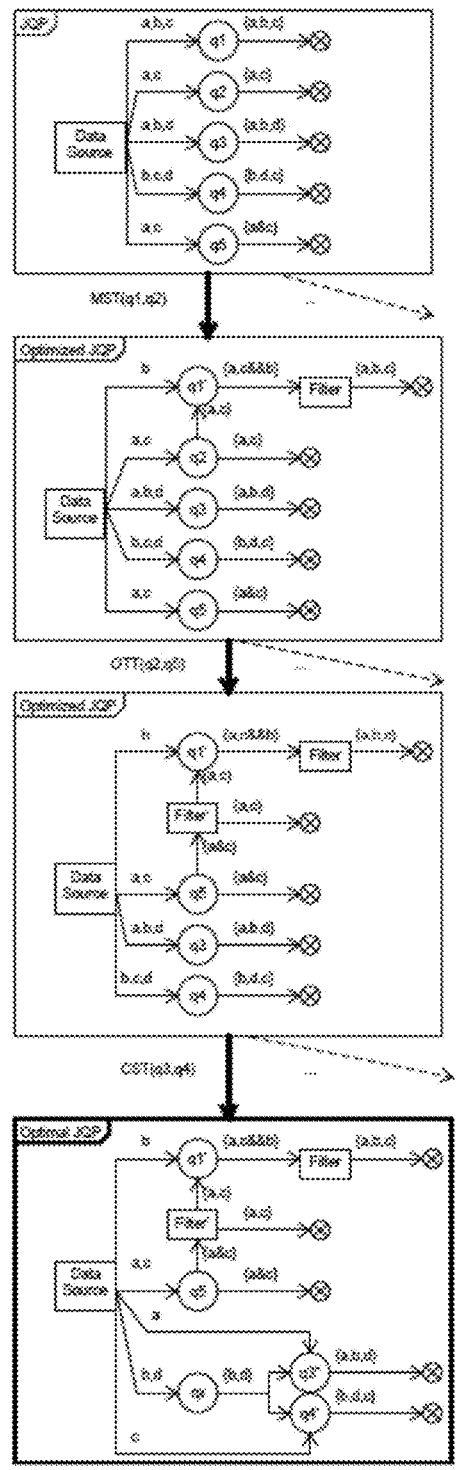
FIG. 16 illustrates an exemplary search process of the JQP search tree of Workload 1.

The optimal jumbo query plan ($JQP_{opt}$) is the JQP such that $\forall JQP$ in the JQP search tree, $Cost(JQP_{opt}) \leq Cost(JQP)$. Given a set of input queries, the optimization problem is to find an optimal jumbo query plan, which is the $JQP_{opt}$ in the JQP search tree. FIG. 16 illustrates an exemplary search process of the JQP search tree of Workload 1 (as shown in FIG. 6). Note that only the chosen JQP transformation that eventually leads to the optimal JQP is shown.

The aforementioned search tree is the search process when solving the Directed Steiner Minimum Tree (DSMT) problem. The Directed Steiner Minimum Tree Problem is defined as follows: given a directed weighted graph G=(V, E) with a cost $c_i$ on each edge $e_i$, a specified root r∈V, and a subset of vertices X⊆V (called Terminal nodes), the goal is to find a tree with minimum cost rooted at r and spanning all the vertices in X (in other words r should have a path to every vertex in X). The cost of the tree is defined as the sum of the costs of the edges in the tree. Note that the tree may include vertices not in X as well (these are known as Steiner nodes).

One of the basic methods to implement the search process of the DSMT is the branch-and-bound algorithm. The essence of this method is to search the entire space coupled with a heuristic to stop exploring branches that do not generate the optimal solution.

The optimization problem may be mapped to the DSMT as follows: queries in the submitted workload are treated as terminal nodes, since they are required by users; and common sub-queries identified by the CST are treated as Steiner node since we may or may not need to execute them. To include the option of computation from scratch, a special query $q_0$ may be added as root into G, called virtual ground. For every query (including sub-query), an incoming edge from $q_0$ may be inserted to represent computing from scratch. If a query can be computed based on results of another query (in the case of MST) or sub-query (in the case of CST &/OTT), an outgoing edge from the source query to the beneficiary query may be added.

Figure 17:
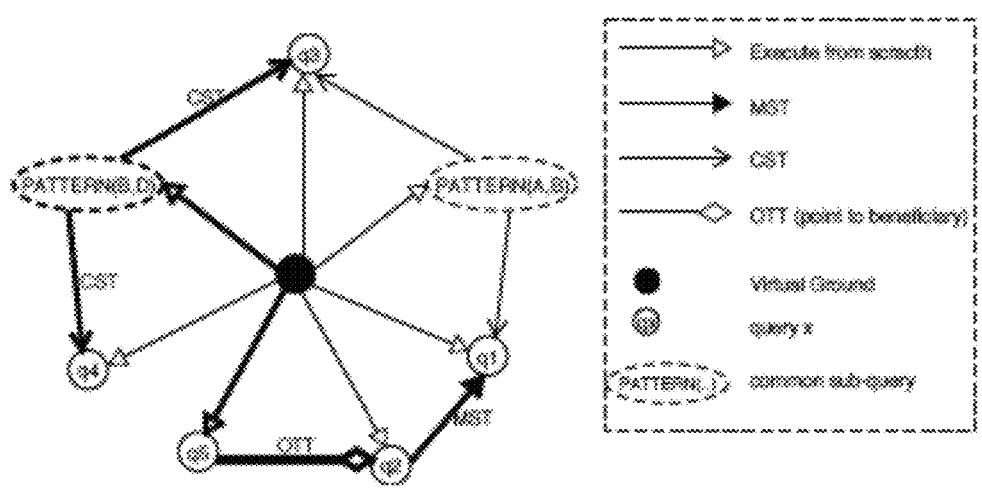
FIG. 17 illustrates an exemplary optimal plan of Workload 1 represented by Steiner Minimum Tree.

FIG. 17 illustrates an exemplary optimal plan of Workload 1 represented by Steiner Minimum Tree (highlighted by the bold lines). To further reduce the search space, the present framework may use a pruning technique based on the cardinality of the pattern query, which is a direct factor for the sharing benefit. The cardinality of a pattern query is the average size of output during the time window t. The worst case cardinality of query q=PATTERN ($E_1, \ldots, E_i, \ldots, E_n$) can be estimated as min ($\mu E1, \ldots, \mu Ei, \ldots, \mu En$)*t, where $\mu Ei$ refers to the average arrival rate of $E_i$.

The main idea of such sharing heuristic is that a common sub-query need not be considered if it has low worst case cardinality because the sharing benefit is small. Consider $q_1$ and $q_3$ from Workload 1, suppose $\mu A$ and $\mu B$ are low, then PATTERN (A,B) can be said to have the low worst case cardinality, thus sharing PATTERN(A,B) among q1 and q3 need not be considered since sharing it or not does not bring much difference. The threshold of the $\mu$ value that should be considered as low may be defined by the user. With a high threshold value, more common sub-queries can be eliminated, which results in a shorter optimization time. In contrast, a low threshold value keeps more common sub-queries, which results in a longer optimization time but a better optimized plan. When this threshold is set to zero, no common sub-query is dropped, and the framework produces the optimal query plan. Addressing adaptive workload (i.e., submit/cancel pattern query during run-time) requires efficient state management to handle intermediate results since pattern queries are stateful.

At 512, CEP system 122 executes the optimal query plan 405 to generate the output data stream. More particularly, the CEP system 122 follows the steps in the optimal query plan 405 to access an input data stream from the data source 130 and identify an event or pattern of events from the input data stream. The output data stream may then include the detection results.

The type of output data stream produced depends on the particular application. For example, a multi-tenant stock monitoring application that runs on common stock trade event stream may generate output data that answers the following query template:

SELECT $E_1, \ldots, E_i, \ldots, E_n$
FROM Stream
MATCHING: [5 seconds: $E_1$ op $\ldots$ op $E_i$ op $\ldots$ op $E_n$]
$E_i$ represents one of the stock symbols in a set of 14 stock symbols, while op belongs to one of the pattern operators.

Figure 18:
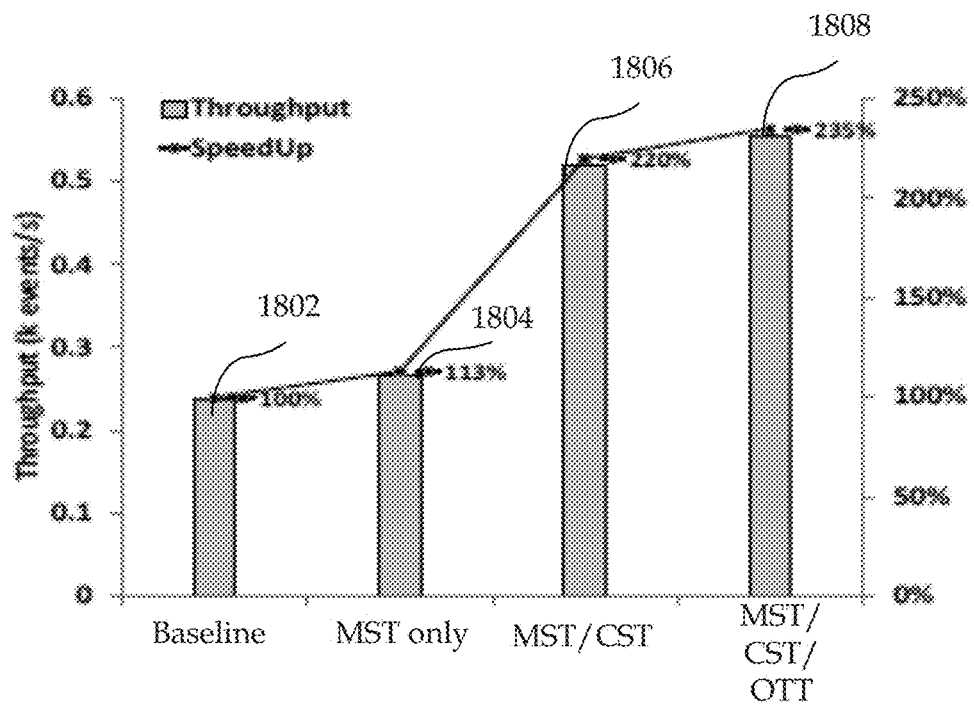
FIG. 18 illustrates the experimental results obtained by a multi-tenant stock monitoring application.

FIG. 18 illustrates the experimental results obtained by a multi-tenant stock monitoring application. 50 pattern queries were evaluated in the experiment. The queries were synthesized by mixing all primitive workloads through changing $E_i$ and op. Bar chart 1802 represents the throughput for the Baseline approach, which executes every pattern query independently. Bar chart 1804 represents the throughput obtained using the present framework with MST only ("MST only"); bar chart 1806 represents the throughput obtained using the present framework with MST and CST only ("MST/CST"); and bar chart 1808 represents the throughput obtained using the present framework with all three techniques—MST, CST and OTT ("MST/CST/OTT").

The present framework significantly outperformed the BaseLine approach by up to 235%. In particular, the MST/CST framework outperformed the MST only framework by up to 194%, thereby demonstrating the effectiveness of the common sharing techniques. Many queries in practice were not able to be directly used to answer another, but they could have some partial similarities. Furthermore, as in many cases, pattern queries use different operators. Some of those queries can still share the intermediate results through a proper operator transformation. As shown in the experiment, the MST/CST/OTT framework further speeds up the performance by 106% compared to the MST/CST framework. Finally, the results show that the optimization time introduced by the present framework is around few hundreds milliseconds, which is negligible since those pattern queries are designed to run for a long time, typically hours or days.

Figure 19:
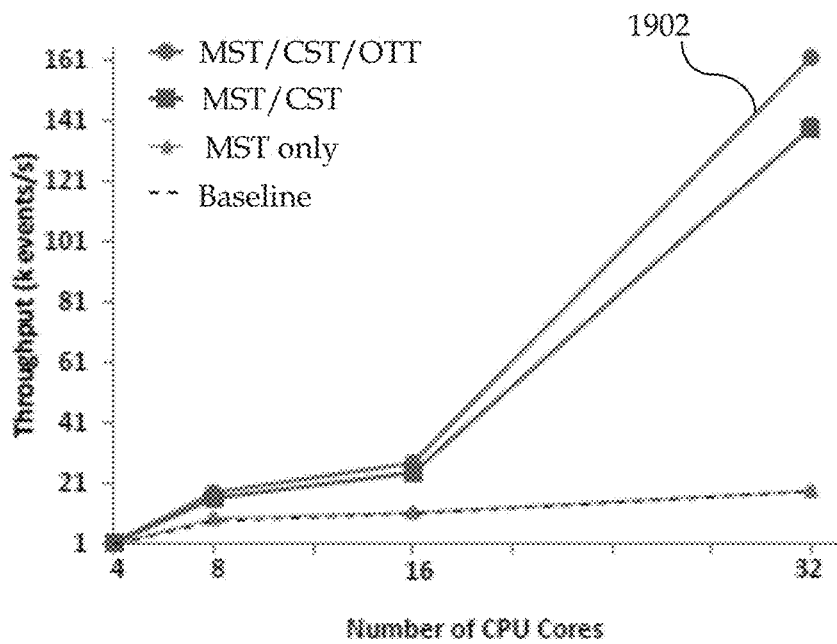
FIG. 19 shows the results of a scalability test with different numbers of central processing unit (CPU) cores.

FIG. 19 shows the results of a scalability test with different numbers of central processing unit (CPU) cores. The number of CPU cores was varied to demonstrate the scalability of the present techniques with different CPU cores. Curve 1902 represents the throughput provided by the framework using all three sharing techniques (MST, CST, OTT).

As shown, the throughput increased the fastest when the number of CPU cores is increased. This demonstrates the scalability of the present framework in terms of physical resources. In addition, FSM decomposition may already have achieved performance benefits due to higher concurrency. When the system is saturated, using only FSM decomposition brings little benefits.

Figure 20:
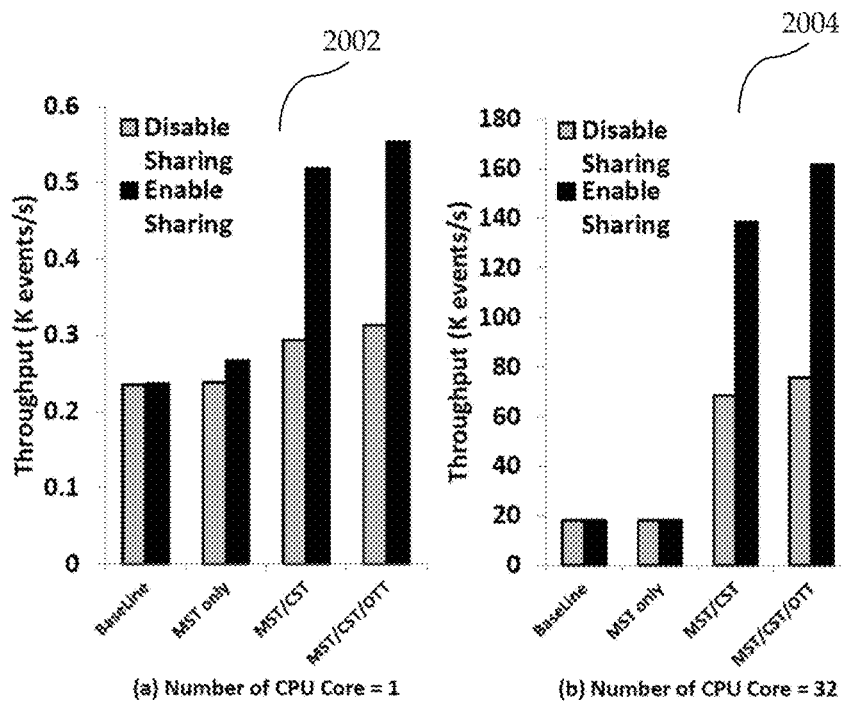
FIG. 20 shows the exemplary results obtained by enabling or disabling data sharing in the framework.

FIG. 20 shows the exemplary results obtained by enabling or disabling data sharing in the framework. More particularly, graph 2002 depicts the results obtained when the number of CPU cores is 1, while graph 2004 depicts the results obtained when the number of CPU cores is 32. When the number of CPU cores increased, FSM decomposition achieved more benefits. Nevertheless, the present framework achieved good performance improvement in all cases.

Another exemplary application of the present framework is data center monitoring. Users (e.g., data center administrator, virtual machine end-users, etc.) may wish to monitor some of the events occurring in the data center. Our testing data was categorized into: 1) network transmission related message; and 2) virtual machine logging message. Event types in the data center monitoring are usually not only restricted by a single attribute. For instance, a user may define event $e_1$ as "one package received from ip: 155.69.149.22 is less than 5 b", $e_2$ as "one package received from ip: 155.69.149.22 is larger than 5 kb", the rest of the events are all defined as event type $e_3$. The user may want to execute the following pattern query.

SELECT $e_1$
FROM Stream
MATCHING: [20 secs: $e_1$, $e_1$, $e_1$, !$e_2$]

Another user, however, may define event $e_1$ as "one package received from ip: 155.69.149.22 is less than 10 kb" or as "one package received from ip: 155.69.149.23 is less than 5 kb" and so on.

In summary, in contrast to stock monitoring, there are two major differences: (1) event types used in pattern query are generally much more divergent since the users can define their own event types in a fairly flexible manner; and (2) the length of PatternList is normally short (i.e., 3 to 5). The number of queries being tested in this case was 90.

Figure 21:
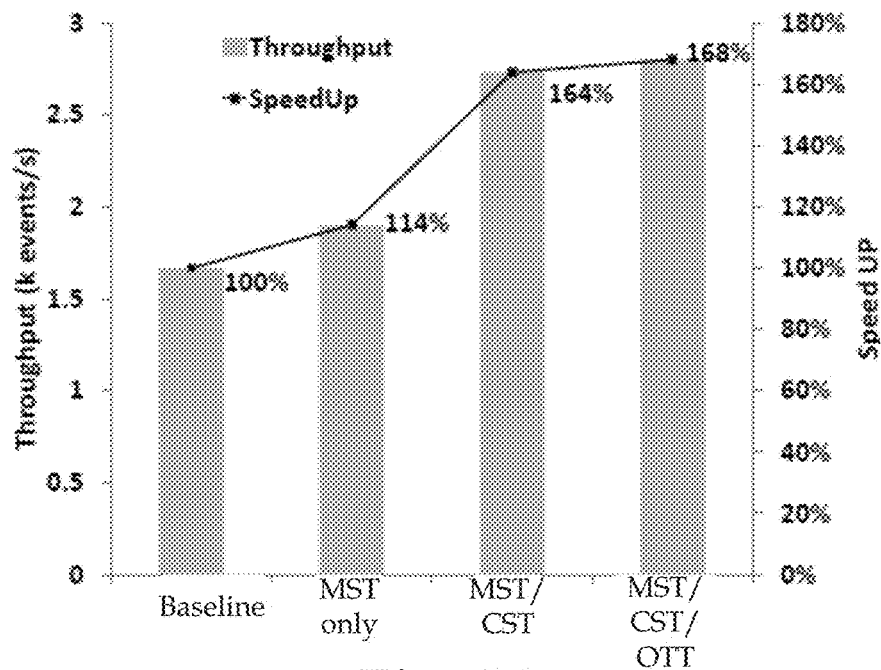
FIG. 21 shows the results obtained by the data center monitoring application.

FIG. 21 shows the results obtained by the data center monitoring application. 90 pattern queries were evaluated. As shown, the present technique significantly outperformed the BaseLine framework by up to 168%. The improvement is smaller than in the previous use case. This is expected as the shorter length of pattern queries brings small fits of sharing, and the diverse event types further reduces sharing opportunities. However, with increasing workload, the present techniques are expected to perform better as the sharing opportunities also increase.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for optimizing pattern queries, comprising:
a non-transitory memory device for storing computer readable program code; and
a processor device in communication with the memory device, the processor device being operative with the computer readable program code to perform steps including:
generating jumbo query plans by applying a common sharing technique and an operator transformation technique, wherein
each jumbo query plan is generated by combining at least two of the pattern queries,
the common sharing technique comprising:
decomposing first and second pattern queries into respective first and second sets of sub-queries based on finite-state machines of the first and second pattern queries, and
identifying, from the first and second sets of sub-queries, a common sub-query sharing results between the first and second pattern queries; and
the operator transformation technique enabling sharing output of a transformed pattern query with other pattern queries associated with different types of operators;
searching, within the jumbo query plans, for an optimal jumbo query plan, and
executing the optimal jumbo query plan on an input data stream to generate an output data stream.

2. The system of claim 1, wherein the processor device is further operative with the computer readable program code to generate the jumbo query plans by further applying a merge sharing technique which reuses computing results of one pattern query to answer another query of a same pattern operator type.

3. The system of claim 1, wherein the processor device is further operative with the computer readable program code to apply the operator transformation technique by performing a negation to sequence transformation.

4. The system of claim 1, wherein the processor device is further operative with the computer readable program code to apply the operator transformation technique by performing a sequence to conjunction transformation.

5. The system of claim 1, wherein the processor device is further operative with the computer readable program code to apply the operator transformation technique by performing a conjunction to disjunction transformation.

6. A method of optimizing pattern queries, comprising:
generating jumbo query plans by applying at least one sharing technique, wherein each jumbo query plan is generated by combining at least two of the pattern queries;
estimating costs of the jumbo query plans;
searching, within the jumbo query plans, for an optimal jumbo query plan based on the estimated costs, the searching utilizing a pruning technique to reduce query search space based on query cardinality of one of the pattern queries, wherein the query search space representing a set of all possible solutions for the pattern queries, and the cardinality being an average size of output during a time window; and
executing the optimal jumbo query plan on an input data stream to generate an output data stream.

7. The method of claim 6, wherein the applying the sharing technique comprises applying a common sharing technique.

8. The method of claim 7, wherein the applying the common sharing technique comprises:
decomposing first and second pattern queries into respective first and second sets of sub-queries based on finite-state machines of the first and second pattern queries; and
identifying, from the first and second sets of sub-queries, a common sub-query sharing results between the first and second pattern queries.

9. The method of claim 6, wherein the applying the sharing technique comprises applying an operator transformation technique which enables sharing output of a transformed pattern query with other pattern queries.

10. The method of claim 9, wherein the applying the operator transformation technique comprises performing a negation to sequence transformation.

11. The method of claim 9, wherein the applying the operator transformation technique comprises performing a sequence to conjunction transformation.

12. The method of claim 9, wherein the applying the operator transformation technique comprises performing a conjunction to disjunction transformation.

13. The method of claim 6, wherein the estimating the costs of the jumbo query plans comprises performing a machine-learning based technique based on mean arrival times of events.

14. The method of claim 6, wherein the searching for the optimal query plan comprises mapping a problem of searching for the optimal query plan into a problem of finding a Directed Steiner Minimum Spanning Tree to be solved by a branch-and-bound search algorithm.

15. A non-transitory computer readable medium embodying a program of instructions executable by machine to perform steps comprising:
 generating jumbo query plans by applying at least two of a common sharing technique, an operator transformation technique, or a merge sharing technique, wherein each jumbo query plan is generated by combining at least two pattern queries;
 the common sharing technique comprising:
  decomposing first and second pattern queries into respective first and second sets of sub-queries based on finite-state machines of the first and second pattern queries, and
  identifying, from the first and second sets of sub-queries, a common sub-query sharing results between the first and second pattern queries;
 the operator transformation technique enabling sharing output of a transformed pattern query with other pattern queries associated with different types of operators; and
 the merge sharing technique reusing computing result of one pattern query to answer another query of a same pattern operator type;
 estimating costs of the jumbo query plans by performing a machine-learning based technique based on mean arrival times of events;
 searching, within the jumbo query plans, for an optimal jumbo query plan based on the estimated costs; and
 executing the optimal jumbo query plan on an input data stream to generate an output data stream.

16. The computer readable medium of claim 15, wherein the machine-learning based technique selected from a group consisting of: polynomial linear regression, support vector regression, multilayer perceptron, Gaussian process for regression, or Kstar (K*).

17. The computer readable medium of claim 15, wherein the applying the operator transformation technique comprises at least one of performing a negation to sequence transformation, performing a sequence to conjunction transformation, or performing a conjunction to disjunction transformation.

18. The computer readable medium of claim 15, wherein the searching for the optimal query plan comprises mapping a problem of searching for the optimal query plan into a problem of finding a Directed Steiner Minimum Spanning Tree to be solved by a branch-and-bound search algorithm.

* * * * *